UNITED STATES PATENT OFFICE.

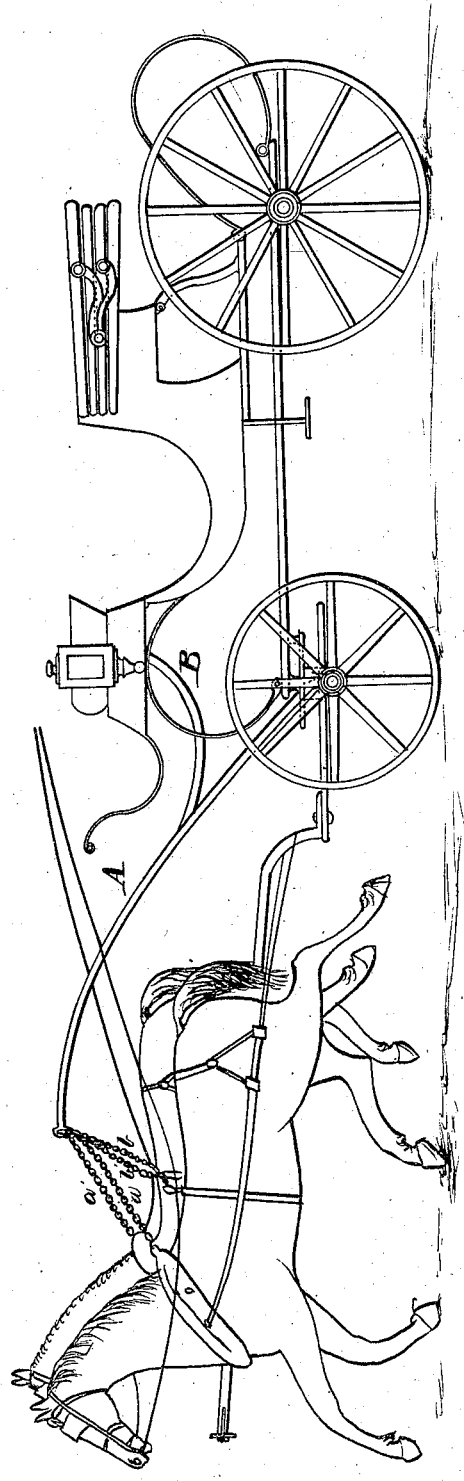

ROBT. D. DWYER, OF RICHMOND, VIRGINIA.

APPARATUS TO PREVENT HORSES IN CARRIAGES FROM FALLING.

Specification of Letters Patent No. 14,395, dated March 11, 1856.

*To all whom it may concern:*

Be it known that I, ROBERT D. DWYER, of Richmond, in the county of Henrico, in the State of Virginia, have invented a new and Improved Apparatus to Prevent Horses from Falling; and I do hereby declare that the following is a full and exact description thereof, reference being had to the accompanying drawings and to the letters of reference marked thereon.

The nature of my invention consists in attaching a frame to the body of a carriage, or to the forward wheel axle and to the carriage, in such a manner that said frame or crane projects over and between the horse or horses and is capable of turning in the same way as the thill or pole, when the horse or horses turn around. To the forward or projecting end of the frame the horse or horses are attached, through its harness, in such a manner as to allow sufficient play, but to support or suspend the horse as soon as the same should slip and be likely to fall.

In the accompanying drawing A represents the frame, attached to the front axle of the carriage, and projects some distance above and between the horses, the arm B passes to the underside of the coachman's seat where it is attached in a manner capable of turning, with the front shaft.

$a, a', b, b'$, are chains attached to the forward end of the frame, A, and fastened to the harness, I, around the body of the horses, and to the collar, O, sufficient play is allowed in the length of those chains for the motion of the horses. When the horse slips on the pavement it is held up by those chains and prevented from falling.

Instead of attaching the chains or straps to the end of the frame, the same may be made to pass over small blocks attached to the frame, and connected with levers attached to the brakes, so that when the horse slips and is suspended the weight of the horse will at the same time act upon the brake and stop, in some measure, the velocity of the carriage.

What I claim as my invention and desire to secure by Letters Patent is—

The application of a suitable projecting frame attached to the most convenient part of the carriage, or to the carriage and front axle, projecting over and between the horse or horses sufficiently far, and at a suitable distance above so that straps, chains or other suitable fastenings can be attached to the harness around the body of the horse and to the collar as shown for the purpose as described.

ROBERT D. DWYER.

Witnesses:
 HENRY E. ROEDER,
 J. R. VAN VALEN.